United States Patent
Yoshikuni et al.

(10) Patent No.: US 6,412,677 B1
(45) Date of Patent: Jul. 2, 2002

(54) CUTTING METHOD FOR PLATE GLASS MOTHER MATERIAL

(75) Inventors: Keisuke Yoshikuni, Akiruno; Shogo Tsukada, Hamura, both of (JP)

(73) Assignee: Hoya Corporation (JP)

( * ) Notice: Subject to any disclaimer, the term of this patent is extended or adjusted under 35 U.S.C. 154(b) by 0 days.

(21) Appl. No.: 09/396,121

(22) Filed: Sep. 14, 1999

(30) Foreign Application Priority Data

Sep. 16, 1998 (JP) .......................................... 10-261348

(51) Int. Cl.$^7$ ............................................. C03B 33/03
(52) U.S. Cl. ............................ 225/2; 225/96.5; 225/103
(58) Field of Search .......................... 225/2, 96, 96.5, 225/94, 103, 104, 105

(56) References Cited

U.S. PATENT DOCUMENTS

| | | | | |
|---|---|---|---|---|
| 2,756,545 A | * | 7/1956 | Atkeson | 225/2 |
| 3,559,855 A | * | 2/1971 | Barnett et al. | 225/2 |
| 3,601,296 A | * | 8/1971 | Pick et al. | 225/103 |
| 4,175,684 A | * | 11/1979 | Butler | 225/2 |
| 4,693,403 A | * | 9/1987 | Sprouse | 225/2 |
| 4,940,176 A | * | 7/1990 | Sato et al. | 225/96.5 |
| 4,948,025 A | * | 8/1990 | Lisec | 225/104 |
| 5,016,800 A | * | 5/1991 | Sato et al. | 225/2 |
| 5,165,585 A | * | 11/1992 | Lisec | 225/2 |
| 5,174,188 A | * | 12/1992 | Petroz | 225/96 |
| 5,301,867 A | * | 4/1994 | Bando | 225/96.5 |
| 5,398,857 A | * | 3/1995 | Shinozaki et al. | 225/96.5 |
| 5,616,064 A | * | 4/1997 | Bando | 225/2 |
| 5,880,351 A | * | 3/1999 | Orita et al. | 73/1.82 |

FOREIGN PATENT DOCUMENTS

JP            403036000 A   *   2/1991

* cited by examiner

*Primary Examiner*—Kenneth E. Peterson
*Assistant Examiner*—Stephen Choi
(74) *Attorney, Agent, or Firm*—Cook, Alex, McFarron, Manzo, Cummings & Mehler, Ltd.

(57) ABSTRACT

There is disclosed a method of cutting a plate glass mother material in which a plurality of grooves are scribed/processed beforehand on one main surface, and appropriate pressing is constantly performed, so that more preferable materials to be pressed can be formed. When a plate glass mother material 20 is pressurized by an indenter 191, and cut in a portion of groove D1, vibration is momentarily generated. The vibration is transmitted to a vibration sensor 193 via an indenter base 190. Subsequently, at the time when the vibration sensor 193 detects the vibration, a Z-axis servo motor 192 of a pressing device 19 stops, and pressing by the indenter 191 stops. Therefore, the indenter 191 does not advance by more strokes than necessary, glass in a cut portion can be prevented from being chipped.

2 Claims, 5 Drawing Sheets

CUTTING METHOD FOR PLATE GLASS MOTHER MATERIAL

This application claims the Paris convention priority of Japanese patent application Hei. 10-2613489 filed on Sep. 16, 1998, the entire disclosure of which is incorporated herein by reference.

BACKGROUND OF THE INVENTION

1. Field of the Invention

The present invention relates to a method of cutting a plate glass member as a mother material of a material to be pressed for use in a reheat press,method, and to a plate glass mother material cutting device, particularly to a method of cutting a plate glass mother material in which a plurality of grooves are scribed/processed beforehand on one main surface, and to a plate glass mother material cutting device.

2. Description of the Related Art

When optical elements such as an optical lens and a prism are formed, press molding is used. Examples of a press molding method mainly include a precision press molding method, a direct press method, and a reheat press method.

The precision press molding method is a molding method of transferring the shape and surface precision of a molding die to a softened glass, and the pressed material requires no grinding or polishing.

On the other hand, the direct press method, and the reheat press method are molding methods based on the premise that after the press molding the grinding for bringing the shape of the pressed material close to a final product shape, and the polishing for polishing the surface of the pressed material are performed.

Since the precision press molding method is free of the polishing, it is suitable for manufacturing lenses having shapes difficult to polish, such as a non-spherical lens. However, in order to reproduce the shape precision of the molding die, pressing has to be performed when the viscosity during pressing is in a relatively high range of $10^8$ to $10^{12}$ dPa·S, and only the glass material satisfying the condition that it fails to be devitrified at the pressing viscosity can be used. Moreover, problems are that a manufacture device is large-scaled and expensive, and that manufacture cost is raised.

Therefore, in order to manufacture a large amount of glass products while the production cost is suppressed, the direct press method and the reheat press method are suitable.

The direct press method comprises injecting a predetermined amount of molten glass flowing out of a discharge pipe into lower and upper dies of the molding die, and performing pressing at a relatively low viscosity of around $10^3$ dPa·S. According to this method, the pressed material has a good weight precision, but the method is not suitable for the production of a small amount of a wide variety of products.

On the other hand, the reheat press method comprises preparing a material to be pressed having a predetermined weight, reheating the material to be pressed from a normal temperature, softening the material, and performing press molding by the molding die at the viscosity of around $10^5$ dPa·S. This method is not suitable for the production of a large amount of a small variety of products, but is suitable for the production of the small amount of the wide variety of products. In the reheat press method, when the weight of the material to be pressed is insufficient as compared with a cavity in the press molding die, the cavity of the molding die is insufficiently filled with the material to be pressed, which causes an elongation defect. Moreover, when the material to be pressed has an excessive weight, another problem occurs that the material overflows the molding die. Therefore, in the reheat press method, the weight adjustment of the material to be pressed is a big problem.

As a method of forming the material to be pressed for use in the reheat press method, there is proposed the following method. First, a plurality of lattice grooves are scribed/processed beforehand on one main surface of a plate glass mother material as the mother material of the material to be pressed. Subsequently, the plate glass mother material is laid on a cushioning material in such a manner that these grooves face downward, portions opposite to the grooves are pressurized from above by a rod-like indenter, and cracks are allowed to grow by stress concentration generated in the grooves, thereby performing cutting. After all the grooves are completely cut, a large number of materials to be pressed which are uniform in weight are formed.

In the above-described method of pressing the portions opposite to the grooves to perform the cutting, since in the beginning the plate glass mother material is sufficiently large, a large bending stress is applied to each groove in addition to the pressure by the indenter. Therefore, even when the pressing amount is small, sufficient cutting can be performed. However, as the cutting proceeds, the plate glass mother material is separated, so that the bending stress is reduced, and a large pressure becomes necessary. Therefore, an appropriate pressing amount for each groove also changes in accordance with cutting situations. If the pressing amount is inappropriate, a preferable material to be pressed cannot be formed. Specifically, when the pressure is insufficient, the plate glass mother material could not be cracked. On the other hand, when the pressure is excessively applied, defects such as chipping are caused.

SUMMARY OF THE INVENTION

The present invention has been developed in consideration of the above-described problems, and an object thereof is to provide a method of cutting a plate glass mother material in which appropriate pressing is constantly performed and more preferable materials to be pressed can be formed, and a plate glass mother material cutting device.

To solve the problem, according to the present invention, there is provided a method of cutting a plate glass mother material in which a plurality of grooves are scribed/processed beforehand on one main surface, comprising: laying the plate glass mother material on a mounting base with the grooves turned inward; pressing portions opposite to the grooves from the outside by a pressing indenter with a pressing amount according to a cutting order of the grooves; performing control to stop the indenter from advancing after the cutting is completed; and cutting the plate glass mother material.

In the method of cutting the plate glass mother material, the plate glass mother material is laid on the mounting base with the grooves facing inward, the portions opposite to the grooves are pressurized from above by the indenter with the pressing amount according to the cutting order of the grooves, the indenter is controlled to stop from advancing after the cutting is completed, and the plate glass mother material is cut.

Therefore, the pressing amount can be prevented from becoming too much or too little, and the cutting defect of the plate glass mother material, the generation of chipping, and the like can be prevented. Therefore, the materials to be pressed uniform in weight can be formed. Moreover, since control is performed to stop the indenter from advancing after the cutting is completed, no further pressing than necessary is performed. Therefore, the cut glass member is prevented from being chipped.

BRIEF DESCRIPTION OF THE DRAWINGS

FIG. 7 shows side views of the auxiliary cutting member.

DETAILED DESCRIPTION OF PREFERRED EMBODIMENTS

Embodiments of the present invention will be described hereinafter in detail with reference to the drawing.

Figure 1:
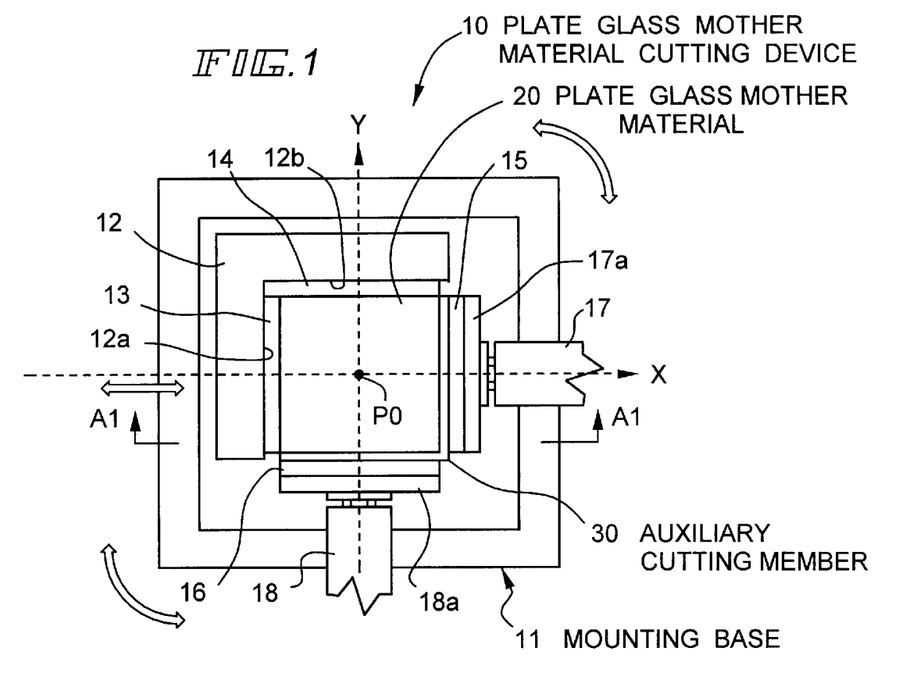
FIG. 1 is a plan view showing a constitution in the vicinity of a mounting base of a plate glass mother material cutting device according to an embodiment.
Figure 2:
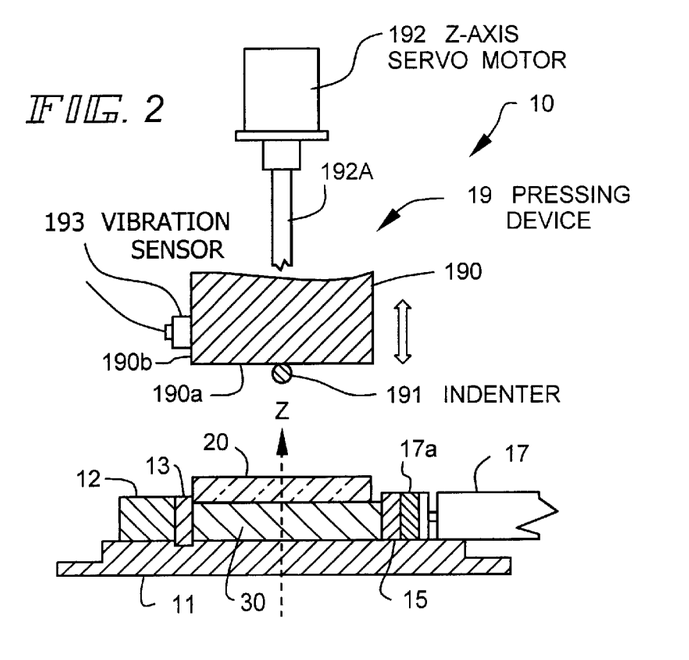
FIG. 2 is a sectional view taken along line A1—A1 of FIG. 1.

FIG. 1 is a plan view showing a constitution in the vicinity of a mounting base of a plate glass mother material cutting device according to an embodiment. Moreover, FIG. 2 is a sectional view taken along line A1—A1 of FIG. 1. In a plate glass mother material cutting device 10, there is provided a mounting base 11 on which a plate glass mother material 20 is laid. The mounting base 11 is disposed in such a manner that it can reciprocate in an X-axis direction of FIG. 1. Moreover, when operation is started, the mounting base 11 is disposed in such a manner that a central point P0 coincides with an origin of X-Y coordinate system. Furthermore, the mounting base 11 is disposed in such a manner that it can rotate in an X-Y plane around an axis of the central point P0. The movement and rotation of the mounting base 11 are executed by a drive mechanism section described later.

A reference plate 12 is fixed on the mounting base 11. The reference plate 12 is an L-shaped member, and to inner side faces 12a, 12b, positioning members 13, 14 are fixed. The positioning members 13, 14 are formed of elastic materials such as natural rubber so as to prevent chips, and the like from being generated when the plate glass mother material 20 is cut.

Moreover, on the mounting base 11 laid is an auxiliary cutting member 30 which has a substantially square plate shape. The auxiliary cutting member 30 is pressed against the positioning members 13, 14 of the reference plate 12 by press devices 17 and 18. To a press plate 17a of the press device 17, a positioning member 15 formed of natural rubber is fixed. The press device 17 pushes the auxiliary cutting member 30 in the X-axis direction via the positioning member 15, and presses the member toward the positioning member 13 of the reference plate 12.

Similarly, to a press plate 18a of the press device 18, a positioning member 16 formed of natural rubber is fixed. The press device 18 pushes the auxiliary cutting member 30 in a Y-axis direction via the positioning member 16, and presses the member toward the positioning member 14 of the reference plate 12. In this manner, the auxiliary cutting member 30 is positioned/fixed on the mounting base 11.

On the auxiliary cutting member 30 laid is the plate glass mother material 20 whose plane shape is square and which is slightly smaller than the auxiliary cutting member 30. The plate glass mother material 20 is laid so as to closely abut on the positioning members 13, 14. In this case, as shown in FIG. 2, most part of the plate glass mother material 20 is protruded from the upper side faces of the positioning members 13, 14, 15, 16. Moreover, since the plate glass mother material 20 is smaller than the auxiliary cutting member 30, an appropriate gap (e.g., 0.1 mm in this embodiment) is formed between the plate glass mother material 20 and the positioning member 15, 16. The gap secures a glass escape space during cutting.

In the mounting base 11, the dimension of each member is designed in such a manner that when the plate glass mother material 20 is laid, the center of the plate glass mother material 20 coincides with the central point P0 of the mounting base 11.

Above the mounting base 11, as shown in FIG. 2, a pressing device 19 is disposed. An indenter base 190 of the pressing device 19 is connected to an axis of Z-axis servo motor 192 via a ball screw 192a. The indenter base 190 moves vertically along Z axis by rotation of the Z-axis servo motor 192. To a lower surface 190a of the indenter base 190 fixed is a columnar indenter 191 extending in the Y-axis direction. The indenter 191 is a member to press the plate glass mother material 20 from above and cut the material as described later, and has substantially the same length as that of a groove in the plate glass mother material 20.

Moreover, to a side face 190b of the indenter 190, a vibration sensor 193 as a cutting sensor is attached. The vibration sensor 193 is a sensor whose response frequency is, for example, in the range of 40 Hz to 8 KHz, and which detects the vibration transmitted to the indenter base 190, and transmits a waveform signal in proportion to the vibration to an amplifier described later.

Figure 3:
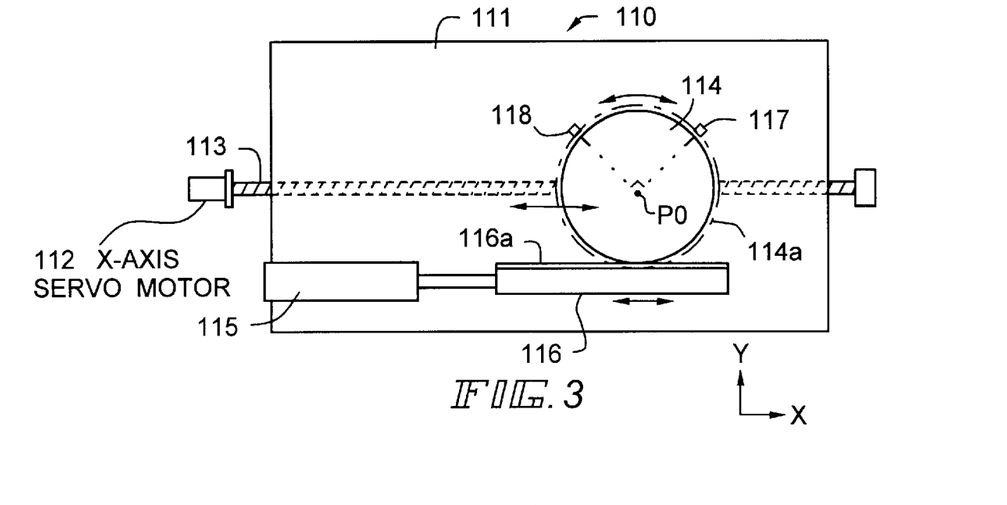
FIG. 3 is a view showing the constitution of a drive mechanism section in the mounting base.

FIG. 3 is a view showing the constitution of a drive mechanism section in the mounting base 11. Here, a plan view is shown, in which the mounting base 11 in FIG. 1 is detached. To a drive mechanism 110, an X-axis servo motor 112 is fixed. A ball screw 113 is attached to the shaft of the X-axis servo motor.

The ball screw 113 is engaged with a base 111, and the base 111 moves in the X-axis direction in accordance with rotation of the ball screw 113. On the other hand, a support board 114 can rotate about the central point P0. Moreover, a pinion portion 114a is formed on the peripheral edge of the support board 114. The pinion portion 114a is engaged with a rack portion 116a of a rack member 116. The rack member 116 is connected to a cylinder 115, and moves in the X-axis direction in accordance with operation of the cylinder 115.

In the drive mechanism 110, when the mounting base 11 is moved, the X-axis servo motor 112 operates to move the base 111. Moreover, by drive of the cylinder 115, the support board 114 rotates. In this case, the rotation of the support board 114 is regulated by mechanical stoppers 117, 118, so that the board can rotate only in a range of 90°.

The concrete constitution of the plate glass mother material 20 will next be described.

Figure 4:
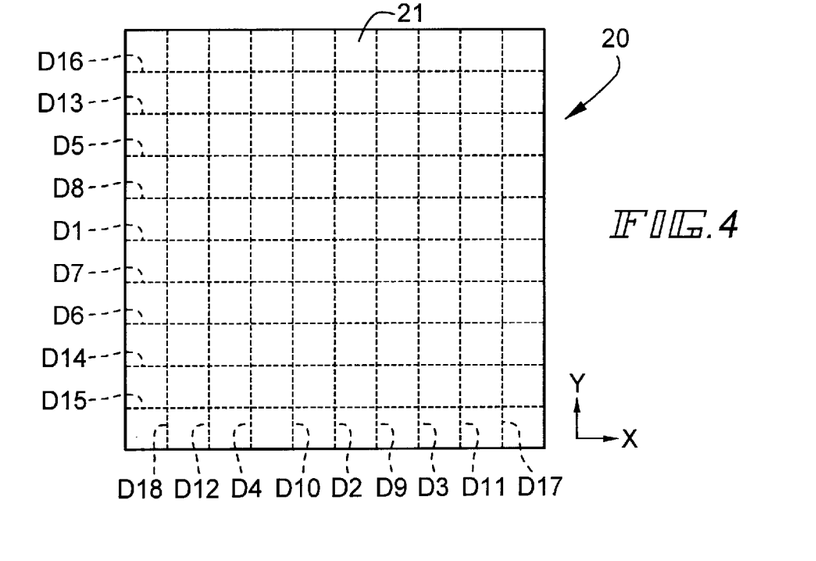
FIG. 4 is a plan view showing the constitution of a plate glass mother material.
Figure 5:
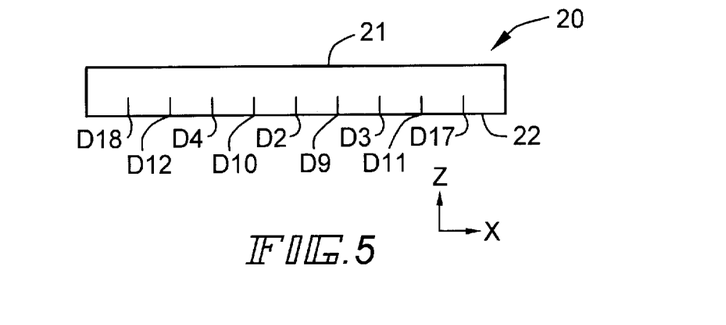
FIG. 5 is front view of FIG. 4.

FIG. 4 is a plan view showing the constitution of the plate glass mother material 20. Moreover, FIG. 5 is a front view of FIG. 4. The plate glass mother material 20 is a plate-like glass, for example, with a size of 85 mm×85 mm ×8 mm. Out of two main surfaces 21, 22 of the plate glass mother material 20, in the lower main surface 22, nine longitudinal and transverse grooves D1 to D18 are formed in a lattice manner. Additionally, in FIGS. 5 and 6, numerals are attached in accordance with a cutting/processing order. The grooves D1 to D18 are formed in a depth of about 0.45 mm by an exclusive scribing device, and each sectional shape is formed in a V-shape, so that cracks are generated in a depth direction.

The plate glass mother material 20 is directed to the coordinate system as shown in the drawing, and laid on the auxiliary cutting member 30 while the main surface 22 with the grooves formed therein faces downward (inward).

Figure 6:
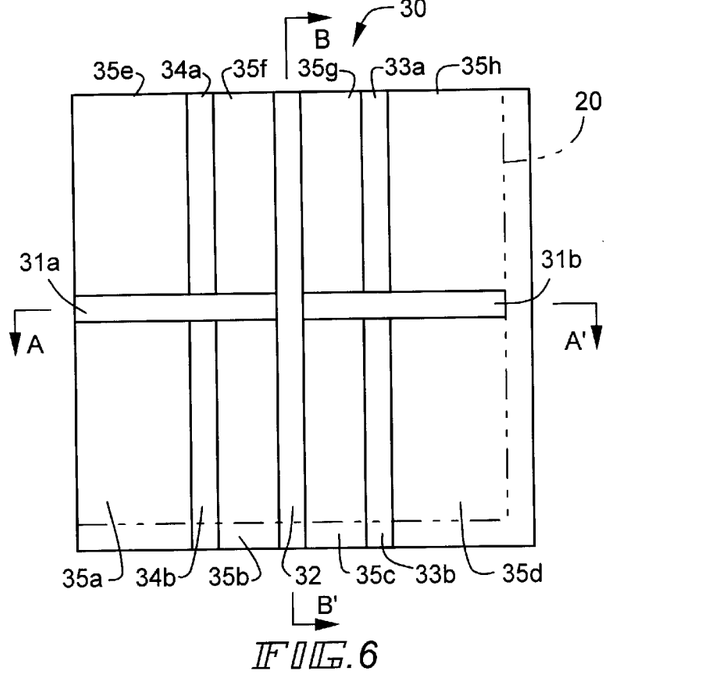
FIG. 6 is a plan view showing the constitution of an auxiliary cutting member.
Figure 7A:
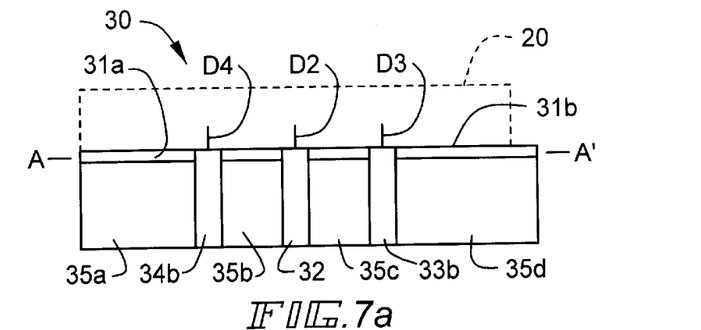
FIG. 7A is a side view as seen from an arrow direction X1 of FIG. 6.
Figure 7B:
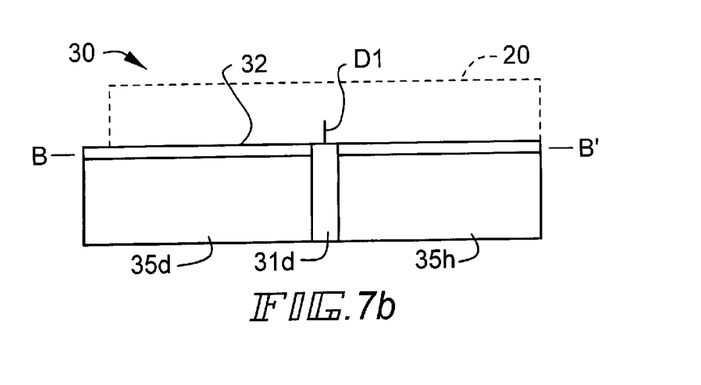
FIG. 7B is a side view as seen from an arrow direction Y1 of FIG. 6.

FIG. 6 is a plan view showing the constitution of the auxiliary cutting member 30. Moreover, FIG. 7 shows side views of the auxiliary cutting member 30: FIG. 7A is a side view as seen from an arrow direction X1 of FIG. 6; and FIG. 7B is a side view as seen from an arrow direction Y1 of FIG. 6. As described above, the auxiliary cutting member 30 is formed in such a manner that its longitudinal and transverse lengths are longer slightly (e.g., by 0.1 mm for each) than those of the plate glass mother material 20. The auxiliary cutting member 30 is constituted of eight base blocks 35a to 35h and seven abutment members 31a, 31b, 32, 33a, 33b, 34a, 34b, which are integrally formed.

Each of the abutment members 31a, 31b, 32, 33a, 33b, 34a, 34b is formed of a material lower in Young's modulus than a glass substrate, for example, of natural rubber to have a thickness of about 5 mm. Moreover, the abutment members 31a, 31b, 32, 33a, 33b, 34a, 34b are formed in such a manner that, as shown in FIG. 7, the heights of upper surfaces substantially coincide with one another and that the members are protruded from the upper surfaces of the base blocks 35a to 35h only by a predetermined amount (e.g., 0.5 mm). The protruded amount and material of each abutment member are selected so that when the members are compressed by the pressure during cutting of the plate glass mother material 20 the heights coincide with these of the base block surfaces.

On the other hand, the base blocks 35a to 35h are formed of urethane rubber. The base blocks 35a to 35h are formed so as to substantially coincide with one another in upper surface heights.

As shown in FIG. 1 or the like, the plate glass mother material 20 is laid on the above-described auxiliary cutting member 30. In this case, as shown in FIG. 7, the groove D1 is positioned on the abutment members 31a, 31b, the groove D2 is positioned on the abutment member 32, the groove D3 is positioned on the abutment members 33a, 33b, and the groove D4 is positioned on the abutment members 34a, 34b.

The operation of the plate glass mother material cutting device 10 of the embodiment will next be described.

First, before cutting operation is started, as shown in FIGS. 1, 2, the central point P0 of the mounting base 11 is positioned in the origin of X-Y coordinate. On the other hand, as shown in FIG. 2, the pressing device 19 is sufficiently high above the mounting base 11. In this case, the mounting base 11 has its position and direction controlled in such a manner that the groove D1 to be first cut of the plate glass mother material 20 extends along the Y-axis, that is, the base is directed to overlap the indenter 191 of the pressing device 19 in X-Y plane.

When the positioning is completed, the Z-axis servo motor 192 operates to lower the indenter 191, which abuts on a position opposite to the groove D1 on the main surface 21 of the plate glass mother material 20. The indenter 191 is further lowered from this state, so that the crack of the groove D1 is enlarged, and cut.

Figure 8:
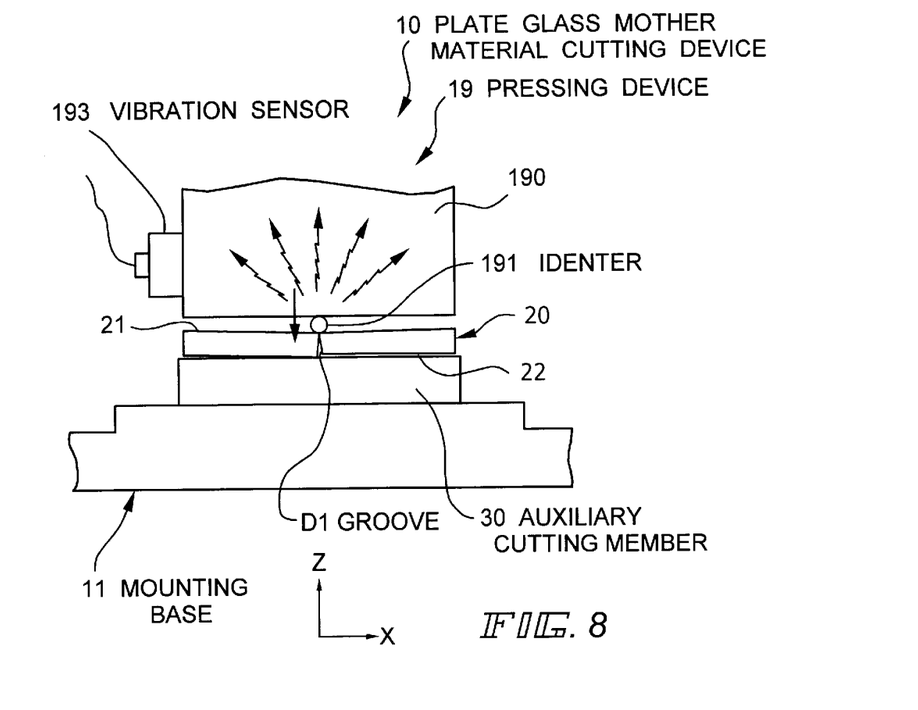
FIG. 8 is a side view showing a state immediately after the plate glass mother material is cut.

FIG. 8 is a side view showing a state immediately after the plate glass mother material 20 is cut. When the plate glass mother material 20 is cut, vibration is momentarily generated. The vibration is transmitted to the vibration sensor 193 via the indenter base 190. At the time when the vibration sensor 193 detects the vibration, the Z-axis servo motor 192 of the pressing device 19 stops, and pressing by the indenter 191 stops. Therefore, since the indenter 191 does not advance by more strokes than necessary, the glass can be prevented from being chipped in the cut portion.

After the cutting of the groove D1 is completed, the indenter base 190 is retreated upward, and the mounting base 11 then rotates by 90° and is positioned to allow the next groove D2 to coincide with the Y-axis. In the same manner as the groove D1, the groove D2 is also pressurized by the indenter 191, and the pressing operation stops with the vibration detection of the vibration sensor 193. After the groove D2 is cut, the mounting base 11 slides in the X-axis direction to enter the cutting operation of the groove D3. Thereafter, according to the similar procedure, the cutting operation to the groove D18 is performed.

The configuration of a control section for performing pressing control based on the vibration detection will next be described.

Figure 9:
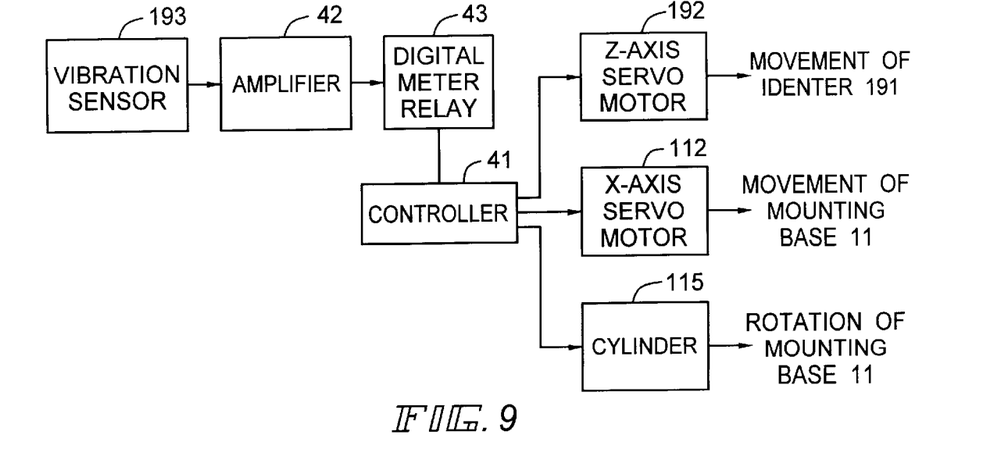
FIG. 9 is a block diagram showing the configuration of a control section for performing pressing control based on vibration detection of the embodiment.

FIG. 9 is a block diagram showing the configuration of the control section for performing the pressing control based on the vibration detection of the embodiment. According to a prepared cutting operation program, a controller 41 controls the Z-axis servo motor 192, the X-axis servo motor 112, the cylinder 115, and the like to perform a series of cutting operation. During the cutting operation, the vibration transmitted to the indenter base 190 of the pressing device 19 is detected by the vibration sensor 193, and the waveform signal is transmitted to an amplifier 42. The amplifier 42 amplifies the waveform signal, and transmits it to a digital meter relay 43. The digital meter relay 43 detects a cutting timing based on the waveform signal. The controller 41 outputs a stop signal at the detected cutting timing, stops the Z-axis servo motor 192, and stops the pressing operation by the indenter 191.

The concrete example of the pressing operation stop control will next be described.

Figure 10:
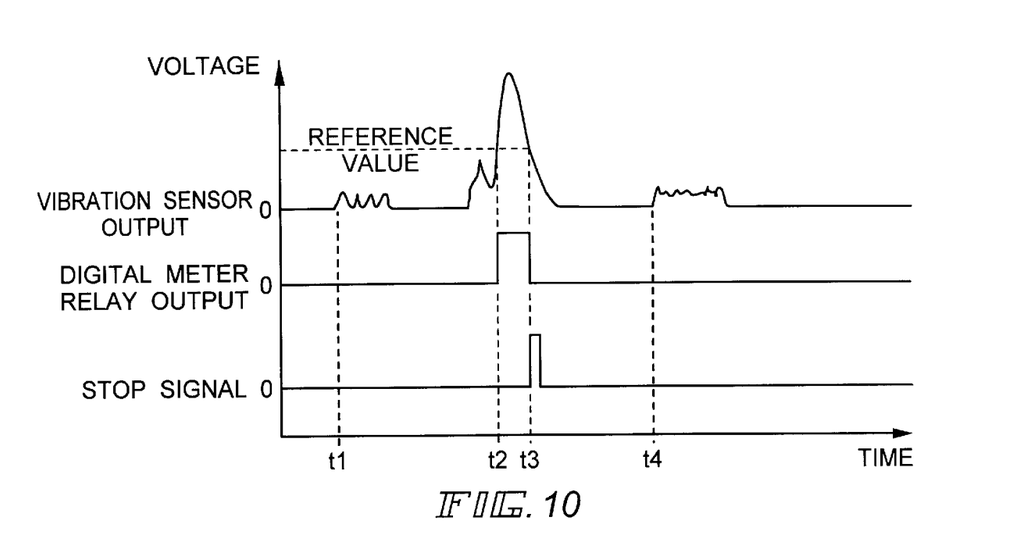
FIG. 10 is a view showing an example of output waveform of each constituting section of FIG. 9.

FIG. 10 is a view showing one example of output waveform of each constituting section of FIG. 9. First, when the pressing device 19 starts the cutting operation, the vibration sensor 193 detects a weak vibration as shown in t1 of FIG. 10. This is a vibration when the indenter 191 is quickly advanced. In a moment while the indenter 191 actually cuts the plate glass mother material 20, a large vibration as in t2 is detected. The digital meter relay 43 outputs a pulse signal while the waveform signal exceeds a reference value. Here, for the reference value, the waveform of the vibration during cutting is recorded by experiments, and the value is predetermined based on the data.

The controller 41 detects the falling of the pulse signal of the digital meter relay 43, and transmits a stop signal to the Z-axis servo motor 192. In response to the stop signal the pressing operation by the indenter 191 stops. After a given time elapses after the stop, the Z-axis servo motor 192 is quickly returned to its retreated position, and the vibration is also detected (t4).

As described above, in the embodiment, since the vibration transmitted from the indenter 191 is detected to judge the cutting, and the pressing operation is stopped with the judgment, no subtle control needs to be performed in accordance with the groove position, and pressing can be stopped at an optimum timing. Therefore, the plate glass mother material 20 is prevented from being broken, and the chipping and other defects are prevented from being generated. Therefore, the materials to be pressed uniform in weight can be formed. Moreover, even when the plate glass mother material 20 differs in the size, the material, the number of grooves, and the like, the operation can constantly be performed with the same program. Therefore, a flexible application can be realized.

Figure 11:
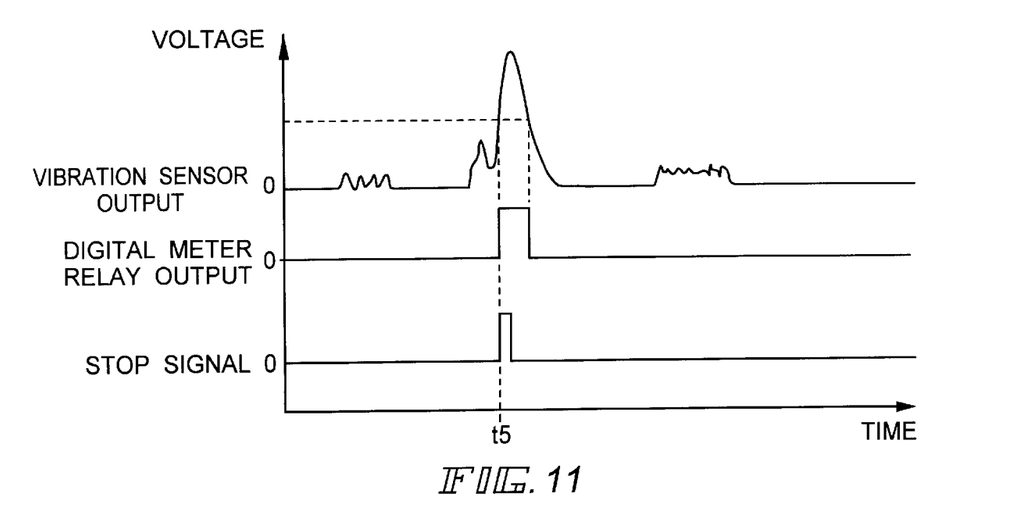
FIG. 11 is a view showing another example of the output waveform.

Additionally, in FIG. 10, the falling of the pulse signal of the digital meter relay 43 is detected, and the stop signal is transmitted to the Z-axis servo motor 192, but as shown in FIG. 11, by detecting the rising of the pulse signal (t5), the stop signal may be outputted.

Moreover, in the embodiment, the vibration sensor 193 is used as the sensor to detect the cutting, but additionally, an acoustic sensor, a pressure sensor, and the like can be used. Furthermore, the cutting may automatically be judged by photographing cutting situation with a camera and performing image processing.

As described above, the materials to be pressed are formed according to the embodiment, and they are used to manufacture a plurality of optical lenses free of polishing by the reheat press method. As a result, uniform pressed materials are obtained.

First, the material to be pressed formed in the example was subjected to barrel grinding, the corner of the material to be pressed was cut, the surface was roughed, and a mold release agent such as boron nitride was uniformly applied to the surface of the material to be pressed.

The barrel polished material to be pressed was heated from a normal temperature, and the heated/softened material to be pressed was laid on a lower die of the press molding die via delivery means. Subsequently, when the viscosity of the heated/softened material to be pressed was in the range of $10^4$ to $10^6$ dPa·S, preferably $10^5$ dPa·S, collective press molding was performed with a plurality of molding dies having molding faces to provide final lens shapes. The molding die is constituted of upper and lower dies, and may include a barrel die. The press molding was performed under atmospheric environment.

When $B_2O_3$—$La_2O_3$ glass type was used in the material to be pressed, the material to be pressed, in a heated/softened state to about 780° C. ($10^5$ dPa·S), was introduced to the lower-die molding face heated to about 660° C. by the delivery means. Subsequently, the lower die was pressed onto the upper die heated to about 670° C., and the softened material to be pressed was press molded under 30 kg/cm² for two or three seconds.

Moreover, when $SiO_2$—$B_2O_3$ glass type was used in the material to be pressed, the material to be pressed, in a heated/softened state to about 870° C. ($10^5$ dPa·S), was introduced to the lower-die molding face heated to about 650° C. by the delivery means. Subsequently, the lower die was pressed onto the upper die heated to about 660° C., and the softened material to be pressed was press molded under 30 kg/cm² for two or three seconds.

Additionally, reheat pressing was performed on the above-described two glass types by changing the viscosity during pressing, and press molding conditions are shown in Table 1.

Since the material to be pressed had a small weight dispersion, during the reheat pressing, the elongation defect of the material to be pressed or the protruding of the material to be pressed from the molding die were not recognized.

The pressed material prepared by the reheat pressing was subjected to coarse grinding, precise grinding, and polishing, so that a final product was obtained.

TABLE 1

|  | $B_2O_3$-$La_2O_3$ type | | | $SiO_2$-$B_2O_3$ type | | |
|---|---|---|---|---|---|---|
| Example Condition | 1 | 2 | 3 | 4 | 5 | 6 |
| Viscosity during pressing (dPa · S) | $10^4$ | $10^5$ | $10^6$ | $10^4$ | $10^5$ | $10^6$ |
| Temperature during pressing (° C.) | 830 | 780 | 750 | 950 | 870 | 790 |
| Upper-die temperature (° C.) | 650 | 670 | 675 | 640 | 660 | 665 |
| Lower-die temperature (° C.) | 640 | 660 | 665 | 630 | 650 | 655 |
| Press pressure (kg/cm²) | 25 | 30 | 35 | 25 | 30 | 35 |
| Press time (seconds) | 4 | 2 to 3 | 2 | 4 | 2 to 3 | 2 |

Another embodiment of the present invention will next be described.

In the above-described embodiment, the cutting is detected by the sensor to stop the pressing, but in the embodiment, by changing the stroke amount of the pressing by the indenter 191 beforehand in accordance with the groove position, optimum cutting is performed. Additionally, here, the basic constitutions of the plate glass mother material, the auxiliary cutting member, and the plate glass mother material cutting device, and the groove cutting order are substantially the same as those shown in FIGS. 1 to 8. Moreover, the speed of the pressing operation is set to be constant at 2.0 mm/sec.

The pressing strokes of the grooves D1 to D18 of the plate glass mother material 20 are shown in Table 2.

TABLE 2

| Groove Position | Pressing Stroke (μm) | Auxiliary Member Material |
|---|---|---|
| D1 | 70 | natural rubber |
| D2 | 70 | natural rubber |
| D3 | 300 | natural rubber |
| D4 | 300 | natural rubber |
| D5 | 300 | urethane rubber |
| D6 | 300 | urethane rubber |
| D7 | 1000 | urethane rubber |
| D8 | 1000 | urethane rubber |
| D9 | 1000 | urethane rubber |
| D10 | 1000 | urethane rubber |
| D11 | 600 | urethane rubber |
| D12 | 600 | urethane rubber |
| D13 | 600 | urethane rubber |
| D14 | 600 | urethane rubber |
| D15 | 1000 | urethane rubber |
| D16 | 1000 | urethane rubber |
| D17 | 1000 | urethane rubber |
| D18 | 1000 | urethane rubber |

Here the pressing stroke indicates a distance from where the indenter 191 abuts on the main surface 21 of the plate glass mother material 20 until the pressing operation is completed. The pressing strokes shown in Table 2 follow the following equation (1), and numeric values indicate absolute values.

$$\text{Pressing stroke } (\mu m) = 162.4 - 1232.4 \times R \quad (1)$$

In the equation (1), R denotes the thickness (mm) of the plate glass mother material 20/cut piece width (mm). Moreover, the cut piece width indicates the width of a larger piece out of two pieces formed by cutting. Now, assuming that the size of the plate glass mother material 20 is 85 mm×85 mm×8 mm, for example, in the groove D1, the cut piece width is 85 mm/2=42.5 mm. Therefore, when R=8/42.5 is substituted in the equation (1), the pressing stroke of the groove D1 becomes about −70 ($\mu$m). Then, the absolute value is 70 ($\mu$m) as shown in Table 2.

On the other hand, the auxiliary member material indicates the material of the portion opposite to each groove in the auxiliary cutting member 30. Specifically, for the auxiliary cutting member 30 shown in FIGS. 6, 7, the auxiliary member material of the abutment members 31a, 31b, 32, 33a, 33b, 34a, 34b to the grooves D1 to D4 is natural rubber, while the auxiliary member material of the base blocks 35a to 35h to the grooves D5 to D18 is urethane rubber.

The use of the natural rubber or the urethane rubber is determined, for example, depending on whether the thickness (mm) of the plate glass mother material 20×the cut length (mm) of the groove is not less than 340 (mm). Specifically, when the thickness (mm) of the plate glass mother material 20×the cut length (mm) of the groove is 340 (mm) or more, the natural rubber is used. When it is less than 340, the urethane rubber is used. For example, in the groove D1, 8 (mm)×85 (mm)=680≧340. Therefore, the natural rubber is used in the opposite abutment members 31a, 31b.

Additionally, the conditions of the pressing strokes and the auxiliary member materials are not limited to the above-described conditions, and can appropriately be changed according to the other conditions such as the speed of the pressing operation.

As described above, in the present invention, the plate glass mother material is laid on the mounting base with the grooves facing inward, the portions opposite to the grooves are pressurized from above by the indenter with the pressing amount according to the cutting order of the grooves, the indenter is controlled to be stopped from advancing after the cutting is completed, and the plate glass mother material is cut. Therefore, the pressing amount can be prevented from becoming too much or too little, and the cutting defect of the plate glass mother material, chipping, and the like can be prevented. Therefore, the materials to be pressed uniform in weight can be formed. Moreover, since control is performed in such a manner that after the cutting is completed the indenter is stopped from advancing, no further pressing than necessary is performed. Therefore, the cut glass member is prevented from being chipped.

What is claimed is:

1. A method for cutting a plate glass mother material, comprising the steps of:

a) preparing the plate glass mother material in which a plurality of grooves are scribed beforehand on one main surface thereof;

b) laying the plate glass mother material on a mounting base with the grooves turned inward;

c) pressing portions opposite to each groove to be cut from the outside by a pressing indenter with a pressing amount in accordance with a cutting order for the grooves;

d) controlling the indenter so as to stop advancing when cutting is completed; and e) repeating the steps c) and d) so as to cut the plate glass material sequentially along each groove, wherein each pressing operation of the indenter is stopped when an instantaneous vibration, generated when the plate glass mother material is cracked, is detected.

2. The method according to claim 1, wherein the instantaneous vibration is detected by a vibration sensor.

* * * * *